US012027302B2

(12) United States Patent
Hasegawa et al.

(10) Patent No.: US 12,027,302 B2
(45) Date of Patent: Jul. 2, 2024

(54) INDUCTOR COMPONENT AND METHOD FOR MANUFACTURING SAME

(71) Applicant: Murata Manufacturing Co., Ltd., Kyoto-fu (JP)

(72) Inventors: Shin Hasegawa, Nagaokakyo (JP); Shogo Tokoi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 589 days.

(21) Appl. No.: 17/201,984

(22) Filed: Mar. 15, 2021

(65) Prior Publication Data

US 2021/0287846 A1 Sep. 16, 2021

(30) Foreign Application Priority Data

Mar. 16, 2020 (JP) ................................ 2020-045542

(51) Int. Cl.

*H01F 27/28* (2006.01)
*H01F 17/04* (2006.01)
*H01F 27/30* (2006.01)
*H01F 41/08* (2006.01)

(52) U.S. Cl.

CPC ......... *H01F 27/306* (2013.01); *H01F 17/045* (2013.01); *H01F 27/2823* (2013.01); *H01F 41/08* (2013.01)

(58) Field of Classification Search

CPC .. H01F 27/306; H01F 17/045; H01F 27/2823; H01F 41/08; H01F 27/303; H01F 17/062; H01F 2017/0093; H01F 17/06

See application file for complete search history.

(56) References Cited

U.S. PATENT DOCUMENTS

2016/0181007 A1* 6/2016 Shiokawa ............... H01F 41/08 29/606
2018/0308625 A1* 10/2018 Hasegawa ............... H01L 28/10
2021/0217550 A1* 7/2021 Hundt ..................... H01F 27/25

FOREIGN PATENT DOCUMENTS

CN 108735435 A 11/2018
JP S50-020152 A 3/1975
JP H06-011316 A 1/1994
JP 2013-093388 A 5/2013
JP 2015-228476 A 12/2015

* cited by examiner

*Primary Examiner* — Tuyen T Nguyen

(74) *Attorney, Agent, or Firm* — Studebaker & Brackett PC

(57) ABSTRACT

An inductor component comprises a ring-shaped core; and a coil wound around the core and comprising wire members each constituting a single turn. Each of the wire members has a first side portion facing an inner peripheral surface of the core, a second side portion facing a first end surface that is one end surface of the core and is located in a direction of a center axis of the core, a third side portion facing an outer peripheral surface of the core, and a fourth side portion facing a second end surface that is the other end surface of the core and is located in the direction of the center axis of the core. At least one of the second and third side portions has a bent portion protruding on the core side, and the first and fourth side portions of adjacent wire members are connected.

19 Claims, 11 Drawing Sheets

INDUCTOR COMPONENT AND METHOD FOR MANUFACTURING SAME

CROSS-REFERENCE TO RELATED APPLICATION

This application claims benefit of priority to Japanese Patent Application No. 2020-045542, filed Mar. 16, 2020, the entire content of which is incorporated herein by reference.

BACKGROUND

Technical Field

The present disclosure relates to an inductor component and a method for manufacturing the inductor component.

Background Art

Heretofore, as an inductor component, one disclosed in Japanese Unexamined Utility Model Application Publication No. 50-20152 is known. The inductor component comprises a ring-shaped core and a coil wound around the core. The coil comprises a U-shaped first wire member and a straight second wire member, in which one end of the first wire member is connected to one end of the second wire member to constitute a single turn of the coil.

SUMMARY

In the above-mentioned conventional inductor component, it is required to install the first and second wire members onto the core, then weld one end of the first wire member to one end of the second wire member to form a single turn of the coil, and then connect a plurality of the turns in series. For the alignment of the first and second wire members upon the welding of the first wire member to the second wire member, an advanced control is required. As mentioned above, it takes time and effort to attach the coil to the core.

In these situations, the present disclosure provides an inductor component having such a feature that the operation for attaching a coil to a core can be made easy; and a method for manufacturing the inductor component.

Therefore, an inductor component according to one aspect of the present disclosure comprises a ring-shaped core; and a coil which is wound around the core and comprises a plurality of wire members each constituting a single turn. Each of the wire members has a first side portion which faces an inner peripheral surface of the core, a second side portion which faces a first end surface that is one end surface of the core and is located in a direction of a center axis of the core, a third side portion which faces an outer peripheral surface of the core, and a fourth side portion which faces a second end surface that is the other end surface of the core and is located in the direction of the center axis of the core. The at least one of the second side portion and the third side portion has a bent portion that is bent so as to protrude on the core side, and in any two adjacent wire members in the plurality of wire members, an end portion of the fourth side portion of one of the wire members is connected to an end portion of the first side portion of the other of the wire members, whereby the plurality of wire members are wound spirally around the core.

According to this aspect, because each of the plurality of wire members constitutes a single turn, it becomes possible to reduce the number of welding positions for forming the individual turns upon the attachment of the coil to the core. As a result, the operation for attaching the coil to the core can be made easy.

Furthermore, because at least one of the second side portion and the third side portion has a bent portion, the bulged winding of the wire members can be reduced and thereby the increase in size of the inductor component can be prevented.

Preferably, in one embodiment of the inductor component, the bent portion is provided only in the second side portion of each of the wire members.

According to this embodiment, because the bent portion is provided only in the second side portion, the bent portion is not located in the direction of the diameter of the core, and thereby it becomes possible to prevent the increase in size of the core in the direction of the diameter of the core in the inductor component.

Preferably, in one embodiment of the inductor component, the height of the core in the direction of a center axis of the core is larger than the thickness of the core in the direction of the diameter of the core.

According to this embodiment, because the bent portion is provided in the second side portion that is shorter than the third side portion, the size of the bent portion which is in proportion to the length of side portions can be reduced.

Preferably, in one embodiment of the inductor component, the bent portion is provided only in the third side portion of each of the wire members.

According to this embodiment, because the bent portion is provided only in the third side portion, the bent portion is not located in the direction of the center axis of the core, and thereby it becomes possible to prevent the increase in size of the core in the direction of the center axis of the core in the inductor component.

Preferably, in one embodiment of the inductor component, each of a first corner portion formed between the first side portion and the second side portion, a second corner portion formed between the second side portion and the third side portion, and a third corner portion formed between the third side portion and the fourth side portion has a right angle, and the shape of a cross section of the core which is orthogonal to the direction of extension of the core is quadrilateral.

The term “angle of a corner portion” as used herein refers to an inner angle formed between adjacent side portions. The term “right angle” as used herein includes an absolutely right angle as well as a substantially right angle.

According to this embodiment, because the wire member can be formed in a quadrilateral shape, the wire member can be formed in a shape that fit the shape of the core. In this manner, the bulging of the coil can be prevented and the size of the inductor component can be reduced.

Preferably, in one embodiment of the inductor component, the adjacent wire members are fixed to each other by a bonding member.

According to this embodiment, because the adjacent wire members are fixed to each other by the bonding member, the attached state of plurality of wire members to the core can be made stable.

Preferably, in one embodiment of the inductor component, the bonding member fixes the first side portion of one of the wire members to the first side portion of the other of the wire members, and each of the first side portion of the one of the wire members and the first side portion of the other of the wire members does not have the bent portion.

According to this embodiment, the bonding member is provided on the first side portion of the wire members in which no bent portion is formed. As a result, even when the wire member is bent by utilizing the bent portion as a supporting point upon the attachment of the wire member to the core, the bonding member does not undergo the application of a bending stress and thereby can be prevented from being damaged.

Preferably, in one embodiment of the inductor component, the adjacent wire members share a welded portion which is formed by welding an end surface of an end portion of the fourth side portion of the one of the wire members and a peripheral surface of an end portion of the first side portion of the other of the wire member to each other; and the welded portion has a narrowed portion having a narrowed width as observed from a direction along a center line of an end portion of the first side portion of the other of the wire member.

According to this embodiment, because the welded portion has the narrowed portion, the expansion of the welded portion into the gap between the adjacent turns of the coil can be reduced, and thereby the size of the gap between the adjacent turns of coils can be made smaller. As result, the size of the inductor component can be reduced.

A method for manufacturing an inductor component, which is one aspect of the present disclosure, is a method for manufacturing an inductor component by winding a coil around a ring-shaped core. The method comprises the steps of bending a straight wire material at three points in such a first direction that the wire material can have a quadrilateral shape, thereby forming a first side portion, a second side portion, a third side portion and a fourth side portion; bending the wire material in at least one of the second side portion and the third side portion in a second direction that is opposite to the first direction to form a bent portion, whereby wire members each constituting a single turn of the coil are formed; and, in any two adjacent wire members in the wire members, providing a gap between an end portion of the fourth side portion of one of the wire members and an end portion of the first side portion of the other of the wire members. The method also includes inserting the core into the wire members through the gap formed between the adjacent wire members in such a manner that the first side portion of each of the wire members faces an inner peripheral surface of the core and the second side portion of each of the wire members faces a first end surface of the core which is one of the end surfaces of the core and is located on a direction of a center axis of the core. The method further includes bending each of the wire members by utilizing the bent portion in each of the wire members as a supporting point in such a direction that an end portion of the fourth side portion of the one of the wire members and an end portion of the first side portion of the other of the wire members can be brought close to each other, thereby allowing the third side portion of each of the wire members and an outer peripheral surface of the core to face each other and also allowing the fourth side portion of each of the wire members and a second end surface of the core which is the other end surface of the core and is located in a direction of a center axis of the core: and connecting an end portion of the fourth side portion of the one of the wire members to an end portion of the first side portion of the other of the wire members to form a coil composed of a plurality of the wire members, and then winding the coil around the core.

According to this aspect, because each of the wire members constitutes a single turn, it becomes possible to reduce the number of welding positions for forming the individual turns upon the attachment of the coil to the core. As a result, the operation for attaching the coil to the core can be made easy.

Furthermore, because at least one of the second side portion and the third side portion has a bent portion, the bulged winding of the wire members can be reduced and thereby the increase in size of the inductor component can be prevented.

According to the inductor component and the method for manufacturing the inductor component which are aspects of the present disclosure, it becomes possible to make the operation for attaching the coil to the core easy.

DETAILED DESCRIPTION

Figure 1:
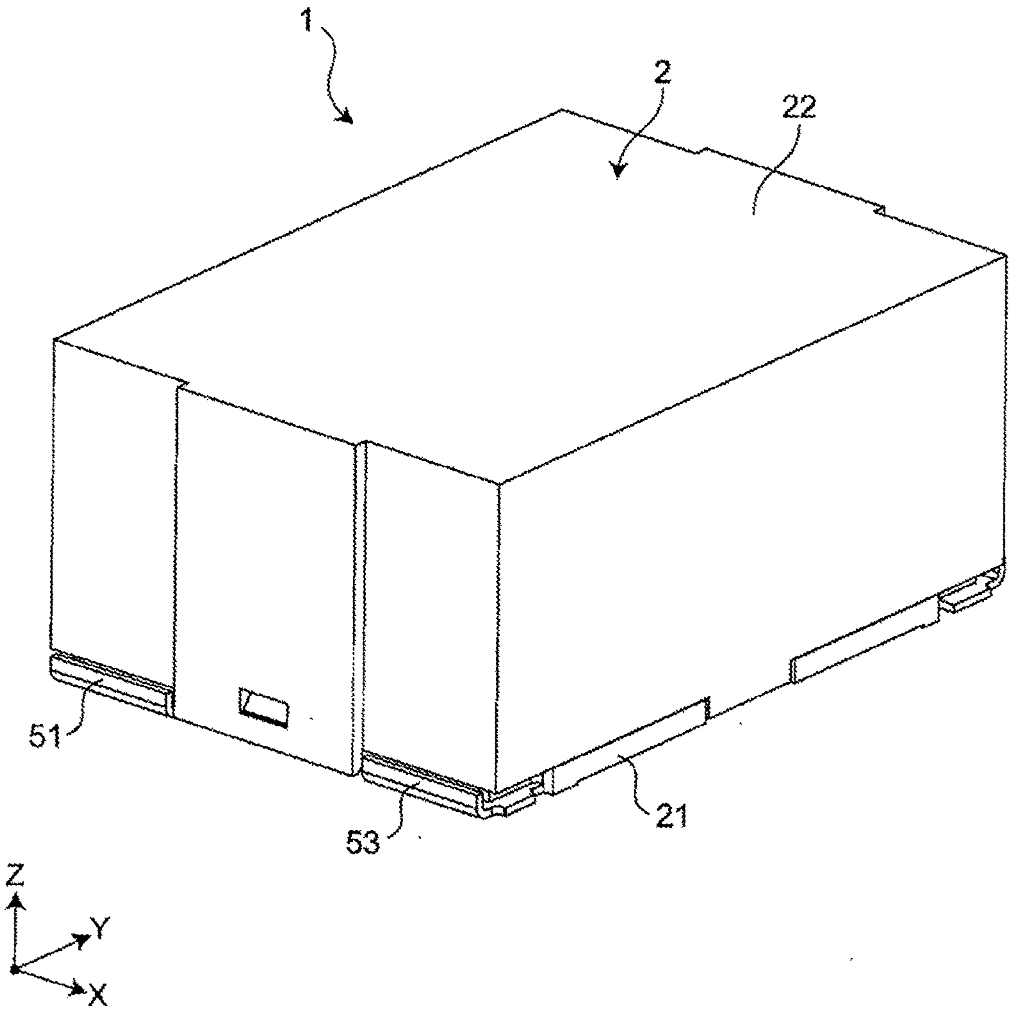
FIG. 1 is an upper perspective view showing an inductor component according to a first embodiment of the present disclosure.

Hereinbelow, an inductor component, which is one aspect of the present disclosure, is described in more detail with reference to the embodiments shown in the drawings. The drawings include some schematic ones, in which real dimensions and proportions may not be reflected.

First Embodiment (Configuration of Inductor Component)

Figure 2:
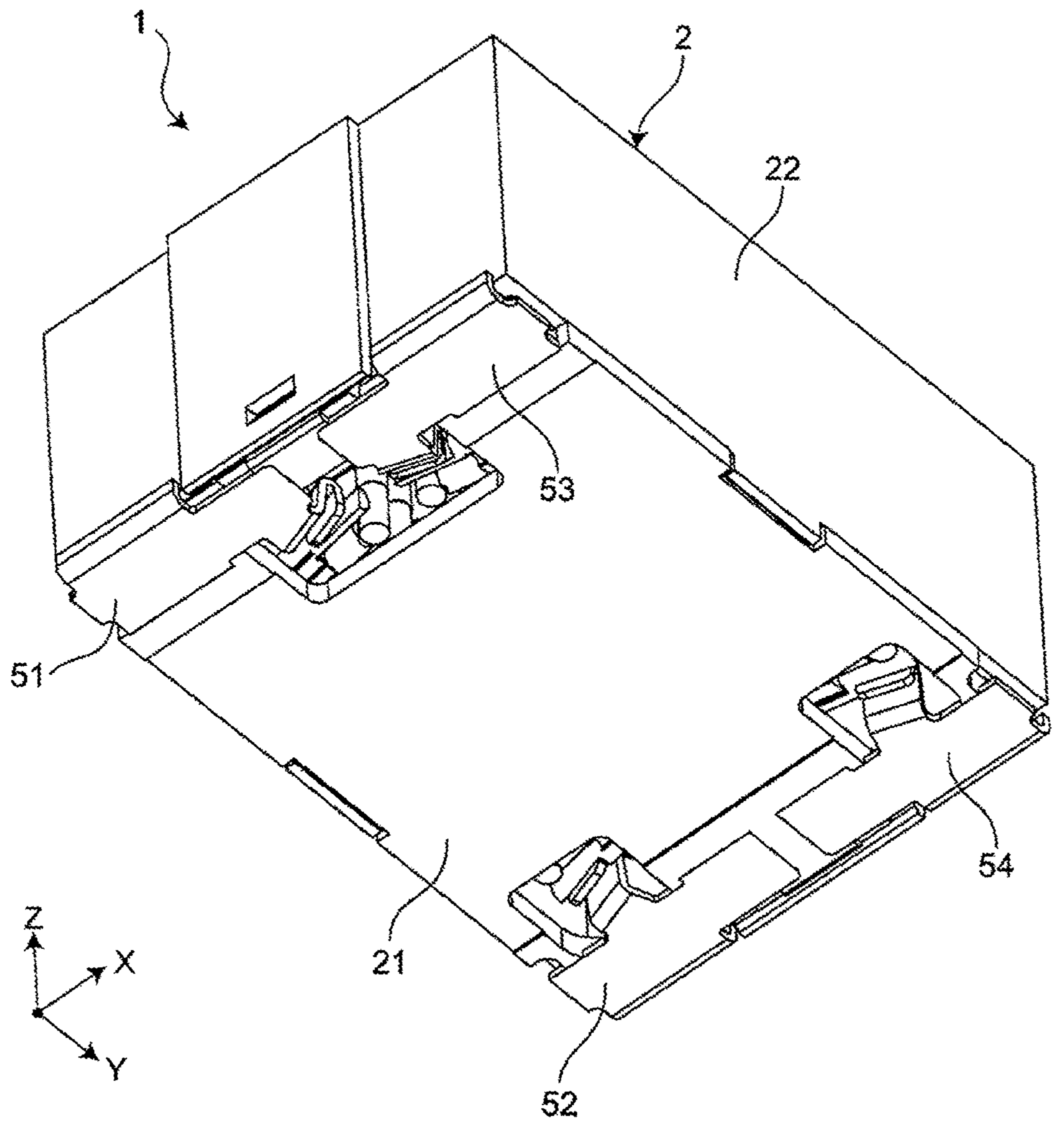
FIG. 2 is a lower perspective view of the inductor component.
Figure 3:
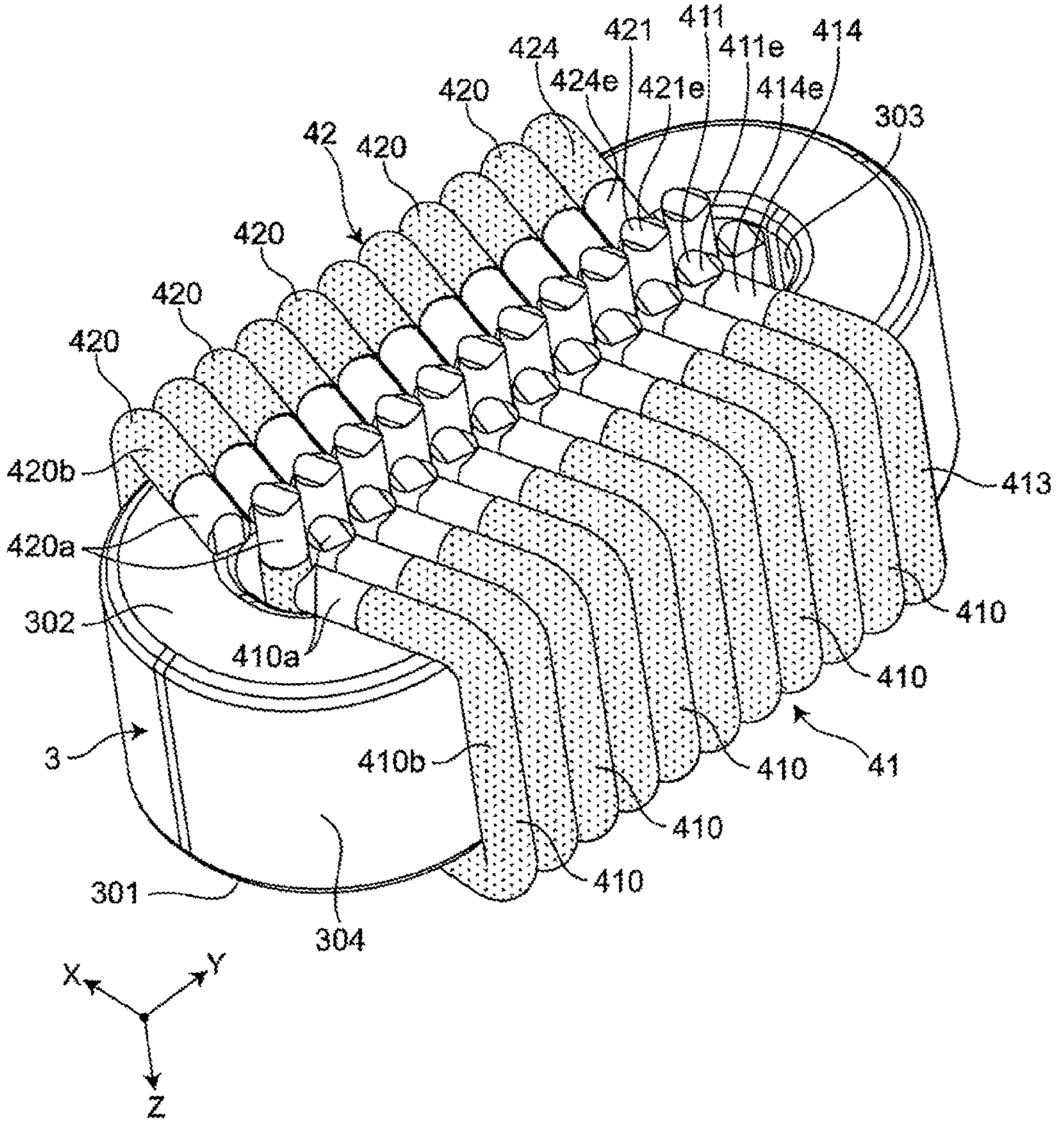
FIG. 3 is a lower perspective view showing the inside of the inductor component.
Figure 4:
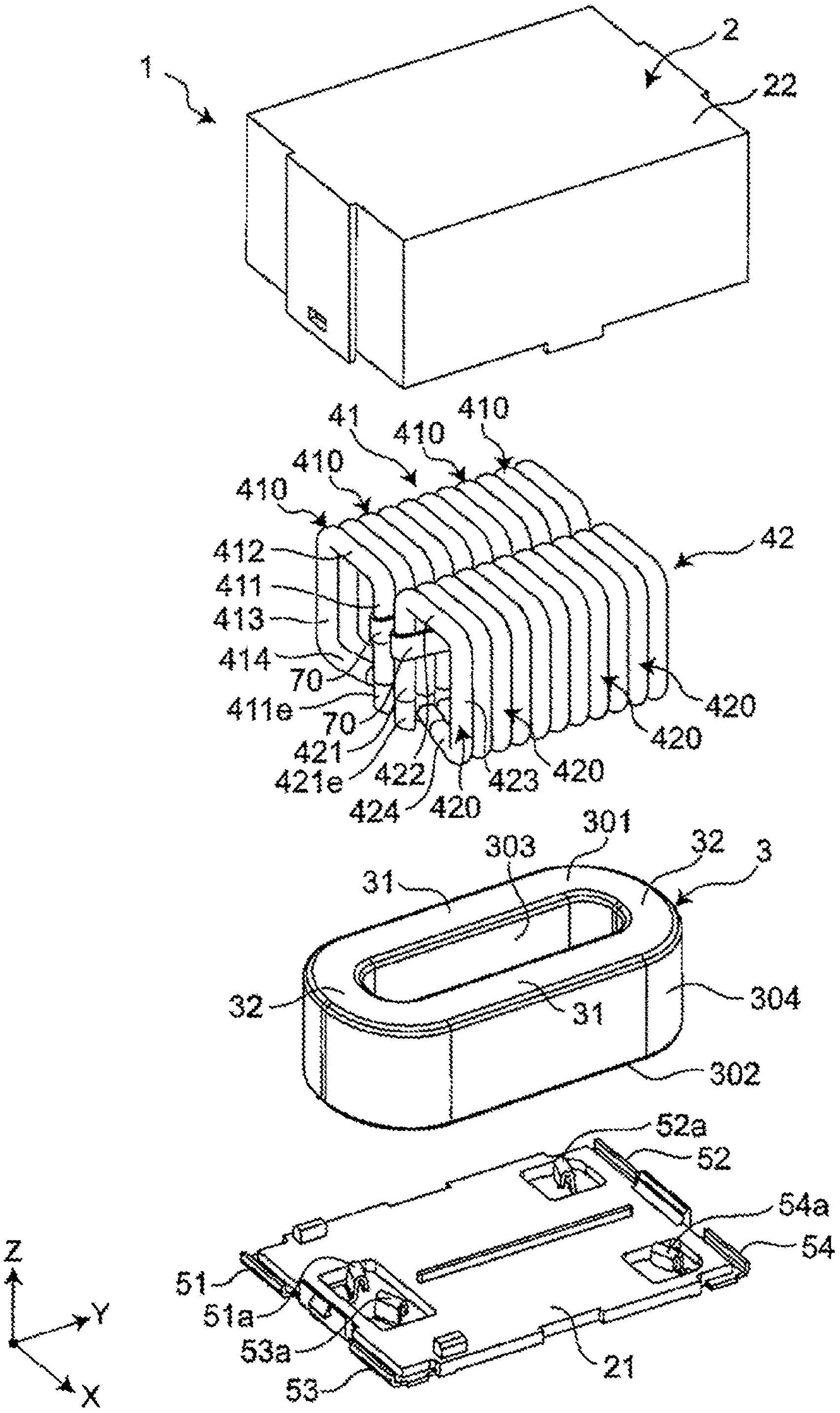
FIG. 4 is an exploded perspective view of the inductor component.
Figure 5:
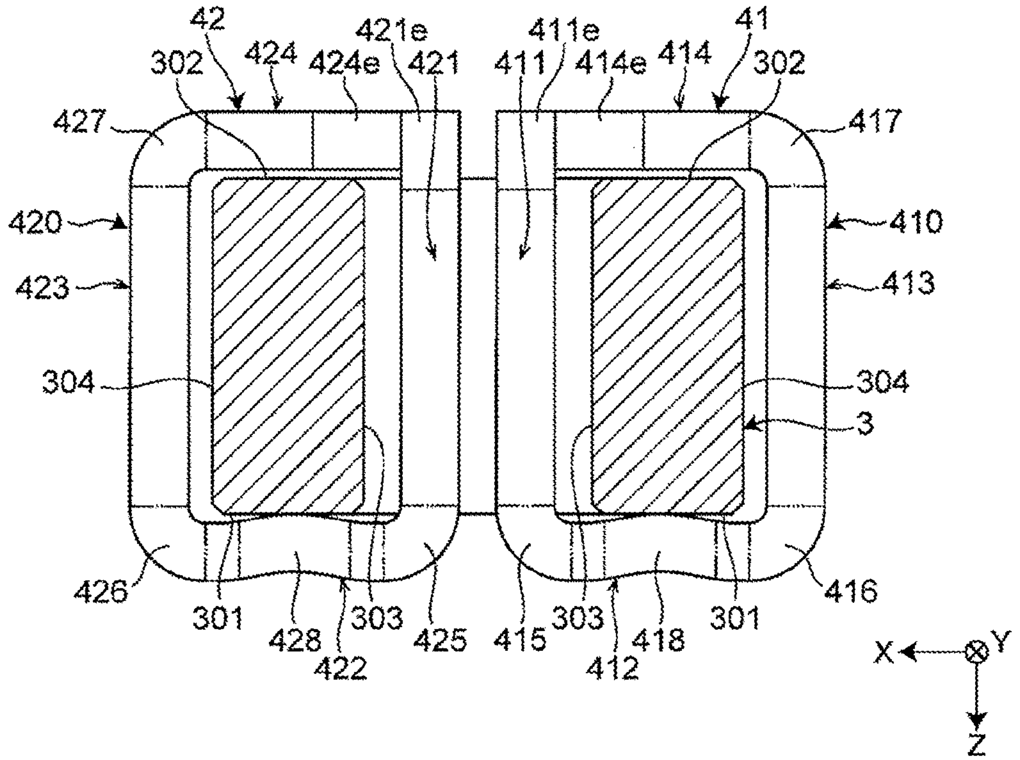
FIG. 5 is a sectional view of the inductor component.

FIG. 1 is an upper perspective view showing an inductor component according to one embodiment of the present disclosure. FIG. 2 is a lower perspective view of the inductor component. FIG. 3 is a lower perspective view showing the inside of the inductor component. FIG. 4 is an exploded perspective view of the inductor component. FIG. 5 is an X-Z sectional view of FIG. 3.

As shown in FIGS. 1 to 5, an inductor component 1 comprises a case 2, a ring-shaped core 3 housed in the case 2, a first coil 41 and a second coil 42 which are wound around the core 3 so as to face each other, and a first electrode terminal 51 to a fourth electrode terminal 54 attached to the case 2 and connected to the first coil 41 and the second coil 42. One example of the inductor component 1 is a common mode choke coil.

The case 2 comprises a bottom plate part 21 and a box-shaped lid part 22 that covers the bottom plate part 21. The case 2 is made from a material having strength and heat resistance, preferably a material having flame retardancy. The case 2 is made from, for example, a resin such as polyphenylene sulfide (PPS), a liquid crystalline polymer (LCP) and polyphthalamide (PPA) or a ceramic. On the bottom plate part 21, the core 3 is placed in such a manner that a center axis of the core 3 intersects the bottom plate part 21 at right angles. The term "center axis of the core 3" as used herein refer to a center axis of an inner-diameter hole part of the core 3. The shape of the case 2 (including the bottom plate part 21 and the lid part 22) is a cuboid.

It is defined as follows: the shorter direction of the case 2 in a direction orthogonal to the center axis of the core 3 as observed from the directions of the center axis of the core 3 is X-direction, and the longer direction of the case 2 as observed from a direction orthogonal to the center axis of the core 3 is Y-direction. The height direction of the case 2 which is orthogonal to both of the X-direction and the Y-direction is Z-direction. The forward direction of the Z-direction is referred to an "upper side", and the backward direction of the Z-direction is referred to as a "lower side". The bottom plate part 21 is arranged on the lower side, and the lid part 22 is arranged on the upper side. In the case where the shape of the case 2 is a cube, the length of the case 2 as observed in the X-direction is identical to the length of the case 2 as observed in the Y-direction.

The first to fourth electrode terminals 51 to 54 are attached to the bottom plate part 21. The first electrode terminal 51 and the second electrode terminal 52 are located at two corners that face each other in the Y-direction on the bottom plate part 21, and the third electrode terminal 53 and the fourth electrode terminal 54 are located at two corners that face each other in the Y-direction on the bottom plate part 21.

The first electrode terminal 51 and the third electrode terminal 53 face each other in the X-direction, and the second electrode terminal 52 and the fourth electrode terminal 54 face each other in the X-direction.

The shape of the core 3 is oval (track-like shape) as observed from the directions of the center axis of the core 3. The core 3 includes a pair of longer-side portions 31 which extend along the longer axis and face each other in the shorter axis direction and a pair of shorter-side portions 32 which extend along the shorter axis and face each other in the longer axis direction, as observed from the center axis direction. The wording "longer axis direction of the core 3" refers to the direction of the longer diameter of the core 3, and the wording "shorter axis direction of the core 3" refers to the direction of the shorter diameter of the core 3. The wording "thickness of the core 3 in the diameter direction" refers to the thickness of each of the longer-side portions 31 as observed in the shorter axis direction or the thickness of each of the shorter-side portions 32 as observed in the longer diameter direction on a cross section orthogonal to the direction in which the core 3 extends in a ring-like shape (wherein the direction is referred to as "core 3 extending direction", hereinafter). The shape of the core 3 may be rectangular, elliptic or circular as observed in the center axis direction.

The core 3 is composed of, for example, a ceramic core made from ferrite or the like or a magnetic core made from an iron-based powder molded article or a nano-crystal foil. The core 3 has a first end surface 301 and a second end surface 302 which face each other in the center axis direction and an inner peripheral surface 303 and an outer peripheral surface 304. The wording "height of the core 3 in the center axis direction" refers to the distance between the first end surface 301 and the second end surface 302. The first end surface 301 is an upper-side end surface of the core 3 and faces the inner surface of the lid part 22. The second end surface 302 is a lower-side end surface of the core 3 and faces the inner surface of the bottom plate part 21. The core 3 is housed in the case 2 in such a manner that the longer axis direction of the core 3 can be consistent with the Y-direction.

The shape of the cross section of the core 3 which intersects the core 3 extending direction at right angles is quadrilateral. The first end surface 301 and the second end surface 302 are arranged perpendicular to the direction of the center axis of the core 3. The inner peripheral surface 303 and the outer peripheral surface 304 are arranged in parallel with the direction of the center axis of the core 3. The term "perpendicular" as used herein includes an absolutely perpendicular state as well as a substantially perpendicular state. The term "parallel" as used herein includes an absolutely parallel state as well as a substantially parallel state.

The first coil 41 is wound around the core 3 in a region between the first electrode terminal 51 and the second electrode terminal 52. One end of the first coil 41 is connected to the first electrode terminal 51. The other end of the first coil 41 is connected to the second electrode terminal 52.

The second coil 42 is wound around the core 3 in a region between the third electrode terminal 53 and the fourth electrode terminal 54. One end of the second coil 42 is connected to the third electrode terminal 53. The other end of the second coil 42 is connected to the fourth electrode terminal 54.

The first coil 41 and the second coil 42 are wound around the core 3 along the longer axis direction so as to face each other in the core 3 shorter axis direction. That is, the first coil 41 is wound around one of the longer-side portions 31 of the core 3, and the second coil 42 is wound around the other of the longer-side portions 31 of the core 3. The winding axis of the first coil 41 and the winding axis of the second coil 42 are parallel with each other. The first coil 41 and the second coil 42 become symmetrical with respect to the longer axis of the core 3.

The number of winding turns of the first coil 41 and that of the second coil 42 are the same as each other. The direction of winding of the first coil 41 around the core 3 and that of the second coil 42 around the core 3 are opposite to each other. That is, the direction of winding of the first coil 41 from the first electrode terminal 51 toward the second electrode terminal 52 and that of the second coil 42 from the third electrode terminal 53 toward the fourth electrode terminal 54 are opposite to each other.

A common-mode electric current flows from the first electrode terminal 51 toward the second electrode terminal 52 in the first coil 41, and also flows from the third electrode terminal 53 toward the fourth electrode terminal 54 in the second coil 42. That is, the first to fourth electrode terminals 51 to 54 are connected in such a manner that the direction of the flow of the common-mode electric current in the first coil 41 and that in the second coil 42 can become identical to each other. When the common-mode electric current flows in the first coil 41, a first magnetic flux generates by the action of the first coil 41 in the core 3. When the common-mode electric current flows in the second coil 42, a second magnetic flux generates in the core 3 in such a direction that the second magnetic flux can be intensified with the first magnetic flux in the core 3. As a result, the first coil 41 and the core 3 and the second coil 42 and the core 3 act as inductance components, and thereby noises against the common-mode electric current can be removed.

The first coil 41 comprises a plurality of wire members 410. The plurality of wire members 410 are connected in series by welding (e.g., laser welding, spot welding) and are wound spirally around the core 3. FIGS. 3 and 4 illustrate a state where the plurality of wire members 410 are assembled, rather than a state where the plurality of wire members 410 are actually welded.

Each of the wire members 410 is a copper wire with a coating film, rather than a printed wiring. Each of the wire members 410 has a length corresponding to a single winding turn in the core 3 peripheral direction which passes through the first end surface 301, the second end surface 302, the inner peripheral surface 303 and the outer peripheral surface 304 of the core 3 on a cross section orthogonal to the core 3 extending direction, and constitutes a single turn of the first coil 41.

As shown in FIG. 5, each of the wire members 410 has a first side portion 411 that faces the inner peripheral surface 303 of the core 3, a second side portion 412 that faces the first end surface 301 of the core 3, a third side portion 413 that faces the outer peripheral surface 304 of the core 3, and a fourth side portion 414 that faces the second end surface 302 of the core 3. The first side portion 411 is arranged in parallel with the inner peripheral surface 303 of the core 3 along the inner peripheral surface 303, the second side portion 412 is arranged in parallel with the first end surface 301 of the core 3 along the first end surface 301, the third side portion 413 is arranged in parallel with the outer peripheral surface 304 of the core 3 along the outer peripheral surface 304, and the fourth side portion 414 is arranged in parallel with the second end surface 302 of the core 3 along the second end surface 302.

In adjacent two wire members 410, 410, an end portion 414*e* of the fourth side portion 414 of one of the wire member 410 is connected to an end portion 411*e* of the first side portion 411 of the other of the wire member 410. In this manner, the plurality of wire members 410 are wound around spirally around the core 3. According this configuration, because each of the plurality of wire members 410 constitutes a single turn, it becomes possible to reduce the number of welding positions for forming the individual turns upon the attachment of the first coil 41 to the core 3. As a result, the operation for attaching the first coil 41 to the core 3 can be made easy.

The first electrode terminal 51 is connected to an endmost wire member 410 as observed in a backward direction of the Y-direction. The first electrode terminal 51 has an attachment part 51*a* that enters the case 2. The end portion 411*e* of the first side portion 411 of the endmost wire member 410 is connected to an attachment part 51*a* in the first electrode terminal 51.

The second electrode terminal 52 is connected to an endmost wire member 410 as observed in a forward direction of the Y-direction. The end portion 411*e* of the first side portion 411 of the endmost wire member 410 is connected to an attachment part 52*a* of the second electrode terminal 52.

Like the first coil 41, the second coil 42 includes a plurality of wire members 420. The plurality of wire members 420 are connected in series by welding (e.g., laser welding, spot welding) and are wound spirally around the core 3. Each of the wire members 420 constitutes a single turn of the second coil 42. Each of the wire members 420 has a first side portion 421 that faces the inner peripheral surface 303 of the core 3, a second side portion 422 that faces the first end surface 301 of the core 3, a third side portion 423 that faces the outer peripheral surface 304 of the core 3, and a fourth side portion 424 that faces the second end surface 302 of the core 3. According this configuration, because each of the plurality of wire members 420 constitutes a single turn, it becomes possible to reduce the number of welding positions for forming the individual turns upon the attachment of the second coil 42 to the core 3. As a result, the operation for attaching the second coil 42 to the core 3 can be made easy.

The third electrode terminal 53 is connected to an endmost wire member 420 as observed in a backward direction of the Y-direction. The end portion 421*e* of the first side portion 421 of the endmost wire member 420 is connected to an attachment part 53*a* in the third electrode terminal 53. The fourth electrode terminal 54 is connected to an endmost wire member 420 as observed in the forward direction of the Y-direction. The end portion 421*e* of the first side portion 421 of the endmost wire member 420 is connected to an attachment part 54*a* in the fourth electrode terminal 54.

As shown in FIG. 3, the first coil 41 includes electrically conductive body parts 410*a* and coating films 410*b* that respectively cover the electrically conductive body parts 410*a*, and the second coil 42 includes electrically conductive body parts 420*a* and coating films 420*b* that respectively cover the electrically conductive body parts 420*a*. In FIG. 3, the coating films 410*b*, 420*b* are illustrated with dots for convenience. One example of the electrically conductive body part 410*a*, 420*a* is a copper wire, and one example of the coating film 410*b*, 420*b* is a polyamideimide resin. The thickness of the coating film 410*b*, 420*b* is, for example, 0.02 to 0.04 mm. More specifically, each of the wire members 410, 420 is composed of the electrically conductive body parts 410*a*, 420*a* and the coating film 410*b*, 420*b*. That is, the electrically conductive body part 410*a* is exposed from the coating film 410*b* at one end 411*e* and the other end 414*e* of the wire member 410 in the first coil 41. Similarly, the electrically conductive body part 420*a* is exposed from the coating film 420*b* in one end 421*e* and the other end 424*e* of the wire member 420 in the second coil 42. The end surface of one end 411*e*, 421*e* has a convex curved surface, and the end surface of the other end 414*e*, 424*e* has a concave curved surface.

As shown in FIG. 5, in the wire member 410 in the first coil 41, the second side portion 412 has a bent portion 418 that is bent so as to protrude toward the core 3 side. The bent portion 418 is located at the center of the second side portion 412. A first corner portion 415 is provided between the first side portion 411 and the second side portion 412, a second corner portion 416 is provided between the second side portion 412 and the third side portion 413, and a third corner portion 417 is provided between the third side portion 413 and the fourth side portion 414. In FIG. 5, the area of each of the first corner portion 415, the second corner portion 416, the third corner portion 417 and the bent portion 418 is indicated with an alternate long and two short dashes line, and the area has a curved side surface in the wire member 410 as observed in the Y-direction.

According to this configuration, as mentioned below in detail, when the bent portion 418 is formed, it becomes possible to put and take the core 3 in and out with respect to the wire member 410 by utilizing the bent portion 418 as a supporting point.

Therefore, a bent portion (i.e., the bent portion 418 and the corner portions 415 to 417) can be formed in the wire member 410 before the insertion of the core 3 into the wire member 410. As a result, the radius of curvature of the bent portion can be reduced, and thereby the occurrence of bulged winding of the wire member 410 can be reduced. In this manner, the increase in size of the inductor component 1 can be prevented. In contrast, if the wire material is wound around a core while bending the wire material, the radius of curvature of a bent portion in the wire material increases, which can cause the occurrence of bulged winding of the wire material.

Furthermore, because the bent portion 418 is not provided in the inner peripheral surface 303 of the core 3, it is not needed to increase the inner diameter of the core 3 for providing the bent portion 418, and thereby the size of the core 3 can be reduced. As a result, the size of the inductor component 1 can be reduced. Furthermore, because the bent portion 418 is provided only in the second side portion 412, the bent portion 418 is not located in the core 3 diameter direction, and thereby it becomes possible to prevent the increase in the size of the core 3 in the core 3 diameter direction in the inductor component 1.

The height of the core 3 as observed in the center axis direction (Z-direction) is larger than the thickness of the core 3 as observed in the core 3 diameter direction (X-direction and Y-direction), and the second side portion 412 is shorter than the third side portion 413 in the wire member 410. Because the bent portion 418 is provided in the second side portion 412 that is shorter than the third side portion 413, the size of the bent portion 418 which varies in proportion to the length of a side portion can be reduced. That is, when it is attempted to bent a longer wire from one end portion toward the other end portion, the longer wire bends with a larger radius of curvature: in contrast, when it is attempted to bent a shorter wire from one end toward the other end, the radius of curvature becomes smaller. Therefore, when a wire is wound around a core, it is preferred that the radius of curvature is as small as possible. In other words, it is preferred that the length of a side portion of a wire member is shorter.

It is preferred that the angle of each of the first corner portion 415, the second corner portion 416 and the third corner portion 419 is a right angle. The term "angle of a corner portion" as used herein refers to an inner angle formed between adjacent side portions, and "a right angle" includes an absolutely right angle as well as a substantially right angle. Because the wire member 410 can be formed in a quadrilateral shape, the wire member 410 can be formed in a shape that fits the shape of the core 3. In this manner, the bulging of the first coil 41 can be prevented, and thereby the size of the inductor component 1 can be reduced.

The wire member 420 in the second coil 42 has the same configuration, wherein the second side portion 422 has a bent portion 428 which is bent so as to protrude on the core 3 side, a first corner portion 425 is provided between the first side portion 421 and the second side portion 422, a second corner portion 426 is provided between the second side portion 422 and the third side portion 423, and a third corner portion 427 is provided between the third side portion 423 and the fourth side portion 424. The wire member 420 has the same effect as that of the wire member 410 in the first coil 41.

As shown in FIG. 4, in the first coil 41, it is preferred that adjacent wire members 410 are fixed to each other by a bonding member 70. Therefore, the attached state of the plurality of wire members 410 to the core 3 can be made stable. It is preferred that the bonding member 70 fixes both of the first side portion 411 of one of the wire members 410 and the first side portion 411 of the other of the wire members 410 to each other. Each of the first side portion 411 of one of the wire members 410 and the first side portion 411 of the other of the wire member 410 does not have the bent portion 418. Therefore, the bonding member 70 is provided on the first side portion 411 of the wire members 410 in which the no bent portion 418 is formed. As a result, even when each of the wire members 410 is bent by utilizing the bent portion 418 as a supporting point for the attachment of the wire members 410 to the core 3, the bonding member 70 does not undergo the application of a bending stress and therefore can be prevented from being damaged.

The wire members 420 in the second coil 42 have the same configuration, and it is preferred that adjacent wire members 420 are fixed to each other by the bonding member 70. It is preferred that the bonding member 70 fixes both of the first side portion 421 of one of the wire members 420 and the first side portion 421 of the other of the wire member 420 to each other. The wire member 420 has the same effect as that of the wire member 410 in the first coil 41.

(Method for Manufacturing Inductor Component)

Next, the method for manufacturing the inductor component 1 is described.

Figure 6A:
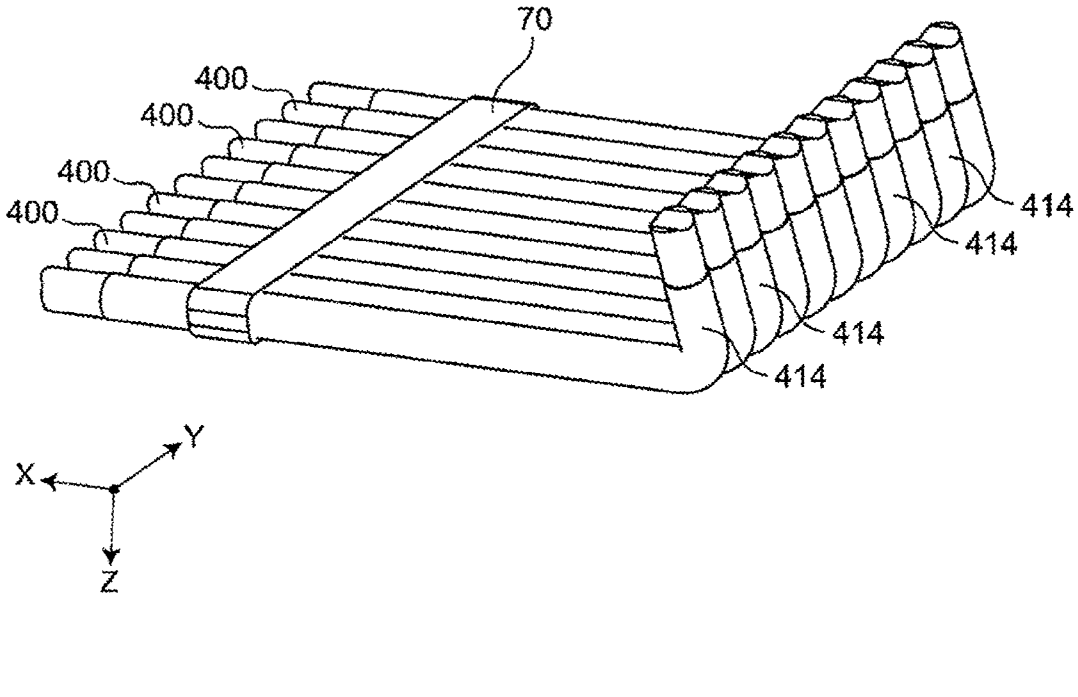
FIG. 6A is a perspective view showing a method for manufacturing the inductor component.

As shown in FIG. 6A, one position in a straight wire material 400 is bent in such a first direction that the wire material 400 can be formed into a quadrilateral shape, thereby forming a fourth side portion 414. In this situation, adjacent wire materials 400 are fixed to each other by the bonding member 70. Therefore, a plurality of wire materials 400 can be handled as a whole.

Figure 6B:
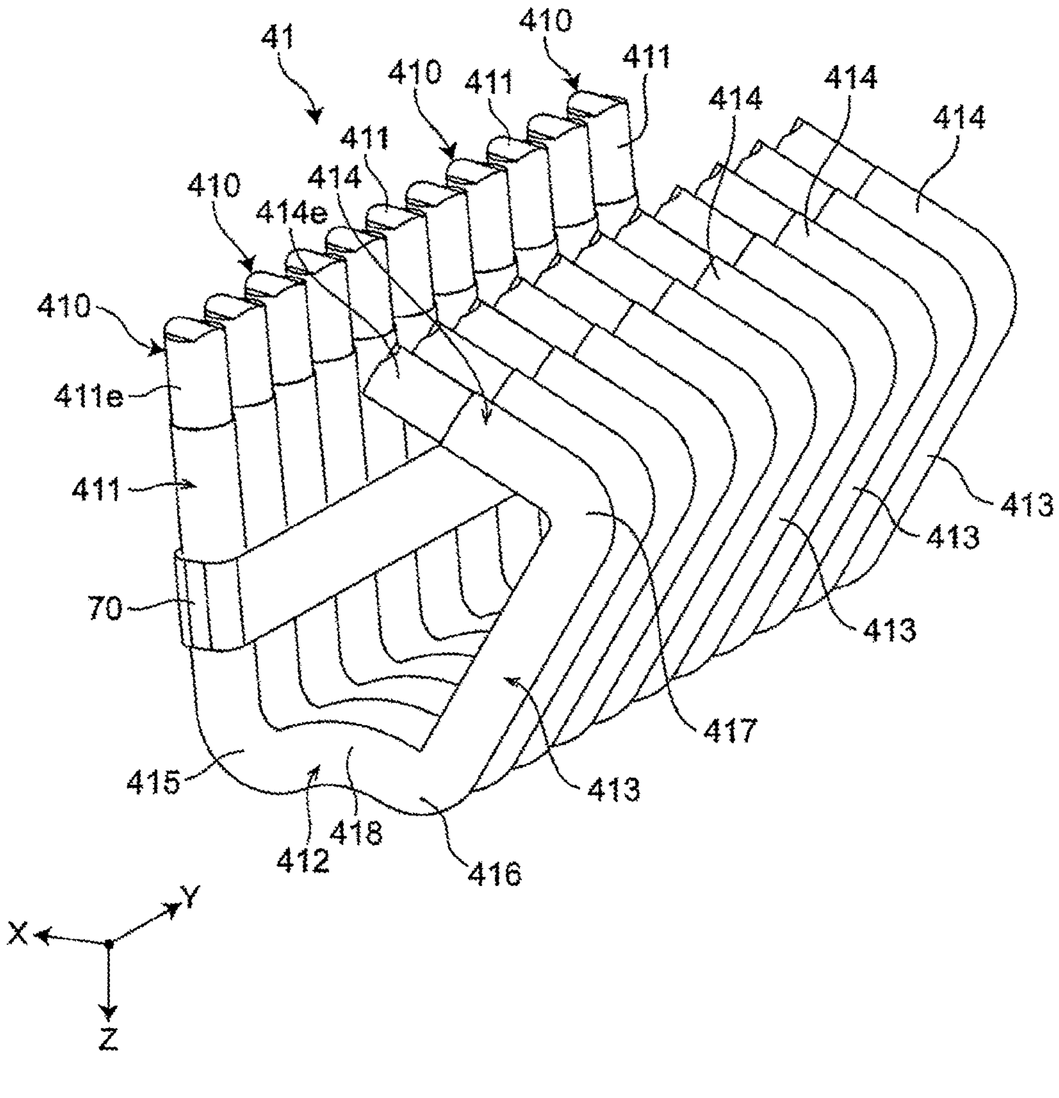
FIG. 6B is a perspective view showing the method for manufacturing the inductor component.

Subsequently, as shown in FIG. 6B, remaining two positions in the straight wire material 400 are bent in the first direction, thereby forming a first side portion 411, a second side portion 412 and a third side portion 413. In this manner, as shown in FIGS. 6A and 6B, the three positions in the straight wire material 400 are bent in the first direction, thereby forming the first side portion 411, the second side portion 412, the third side portion 413 and the fourth side portion 414. The order in which the first side portion 411, the second side portion 412, the third side portion 413 and the fourth side portion 414 are formed can be selected arbitrarily.

Subsequently, the second side portion 412 is bent in a second direction that is opposed to the first direction to form a bent portion 418. In this manner, a wire member 410 that constitutes a single turn of the first coil 41 can be formed. In the adjacent wire members 410, a gap is provided between an end portion 414*e* of the fourth side portion 414 of one of the wire members 410 and an end portion 411*e* of the first side portion 411 of the other of the wire member 410.

Figure 6C:
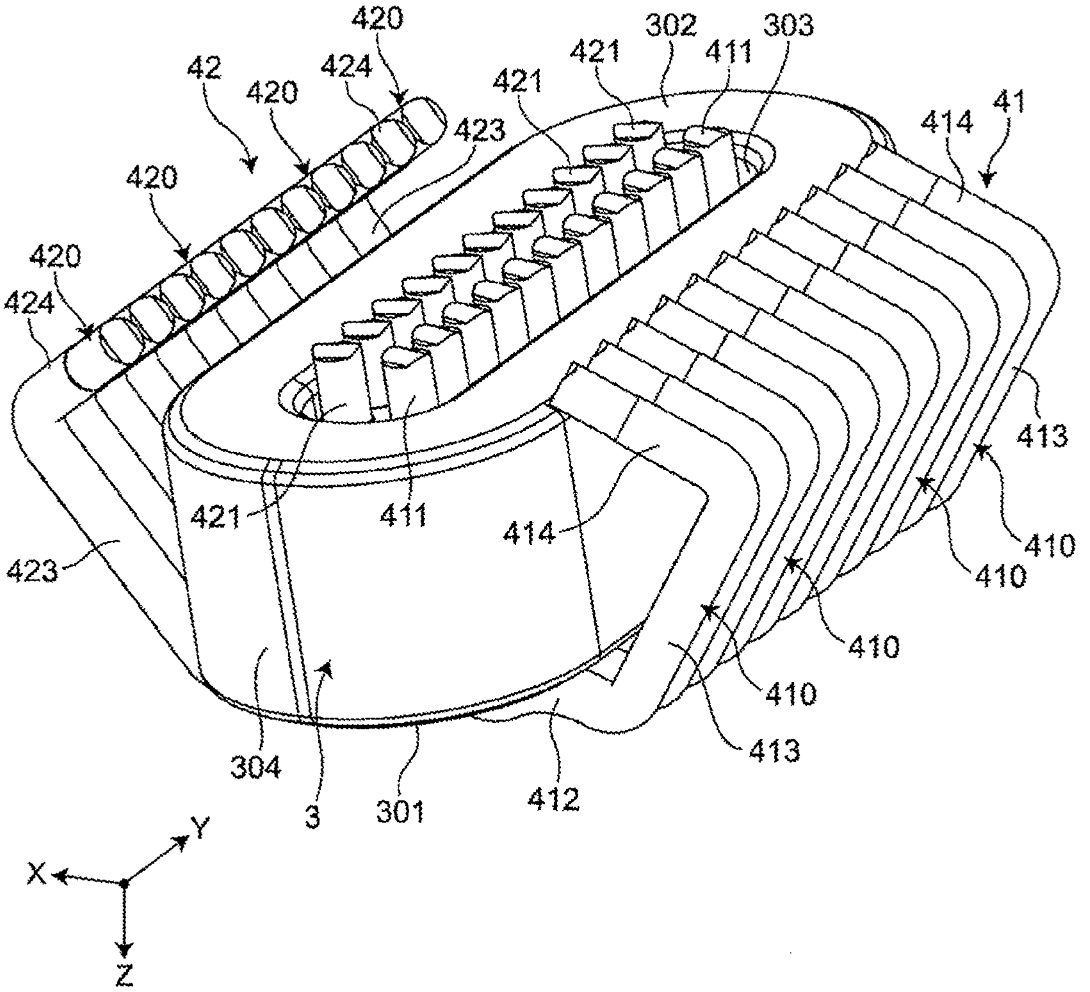
FIG. 6C is a perspective view showing the method for manufacturing the inductor component.

Subsequently, as shown in FIG. 6C, the core 3 is inserted into the wire member 410 from the gap between the adjacent wire members 410 in such a manner that the first side portions 411 of the wire members 410 face the inner peripheral surface 303 of the core 3 and the second side portions 412 of the wire members 410 face the first end surface 301 of the core 3. In this manner, the core 3 is inserted into the first coil 41.

With respect to the second coil 42, the same procedure as that employed for the first coil 41 is carried out as follows: a straight wire material is bent to form a first side portion 421, a second side portion 422, a third side portion 423 and a fourth side portion 424 and also form a bent portion 428 in the second side portion 422, thereby forming a wire member 420 that constitutes a single turn of the second coil 42. In the adjacent wire members 420, a gap is provided between an end portion 424*e* of the fourth side portion 424 of one of the wire members 420 and an end portion 421*e* of the first side portion 421 of the other of the wire member 420. Subsequently, the core 3 is inserted into the wire members 420 from the gap formed between the adjacent wire members 420. In this manner, the core 3 is inserted into the second coil 42.

Figure 6D:
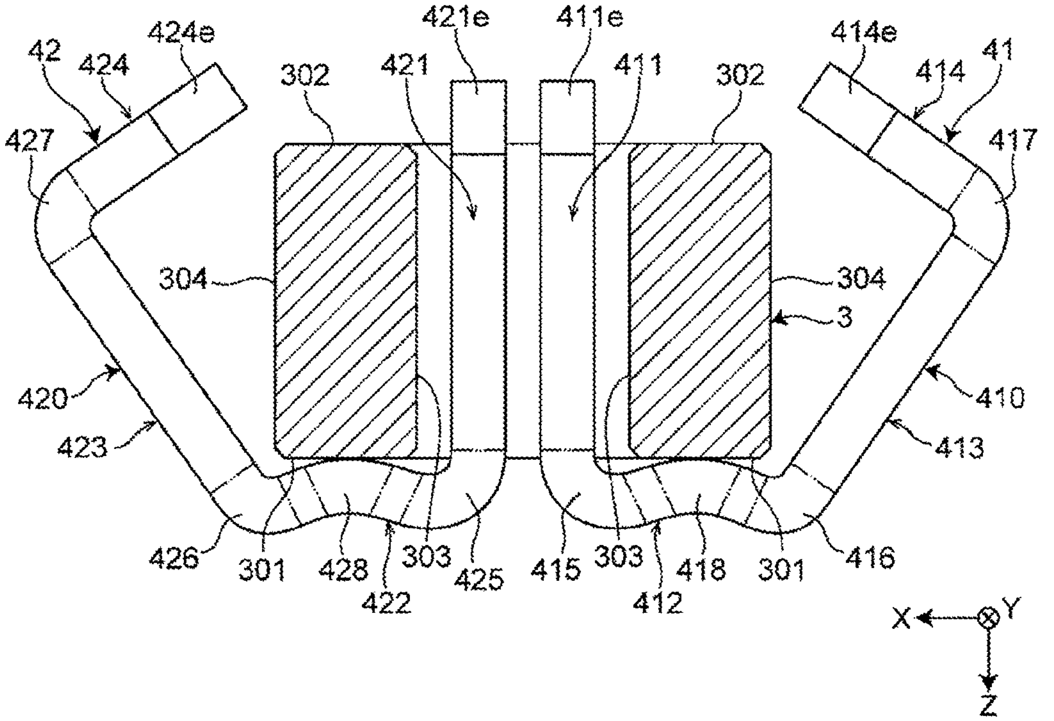
FIG. 6D is a sectional view showing the method for manufacturing the inductor component.
Figure 6E:
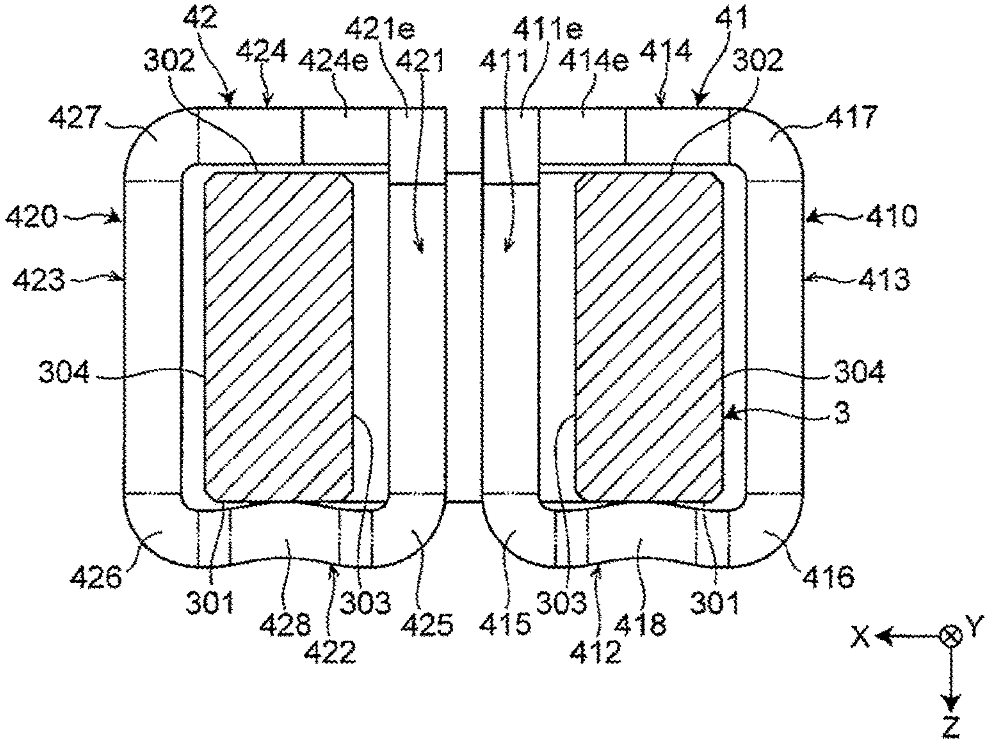
FIG. 6E is a sectional view showing the method for manufacturing the inductor component.

Subsequently, as shown in FIG. 6D, the wire members 410 are bent by utilizing the bent portions 418 in the wire members 410 of the first coil 41 as supporting points in such a direction that the end portion 414*e* of the fourth side portion 414 of one of the wire members 410 and the end portion 411*e* of the first side portion 411 of the other of the wire member 410 can be brought close to each other, thereby the third side portions 413 of the wire members 410 face the outer peripheral surface 304 of the core 3 and the fourth side portions 414 of the wire members 410 face the second end surface 302 of the core 3 as show in FIG. 6E.

With respect to the second coil 42, the same procedure as that employed for the first coil 41 is carried out as follows: the wire members 420 are bent by employing the bent portions 428 in the wire members 420 of the second coil 42 as supporting points in such a direction that the end portion 424*e* of the fourth side portion 424 of one of the wire members 420 and the end portion 421*e* of the first side portion 421 of the other of the wire member 420 can be brought close to each other, thereby the third side portions 423 of the wire members 420 face the outer peripheral surface 304 of the core 3 and the fourth side portions 424 of the wire members 420 face the second end surface 302 of the core 3.

Subsequently, in the first coil 41, in the adjacent wire members 410 having the core 3 inserted therein, the end portion 414*e* of the fourth side portion 414 of one of the wire members 410 is connected to the end portion 411*e* of the first side portion 411 of the other of the wire member 410 by welding. Subsequently, the first coil 41 composed of the plurality of wire members 410 is wound round the core 3. With respect to the second coil 42, the same procedure as that employed for the first coil 41 is carried out as follows: in the adjacent wire members 410, the end portion 424*e* of the fourth side portion 424 of one of the wire members 420 is connected to the end portion 421*e* of the first side portion 421 of the other of the wire member 420 by welding. Subsequently, the second coil 42 composed of the plurality of wire members 420 is wound round the core 3. In this manner, the first coil 41 and the second coil 42 are wound around the ring-shaped core 3, thereby producing the inductor component 1.

According the method for manufacturing the inductor component 1, because each of the plurality of wire members 410, 420 constitutes a single turn, it becomes possible to reduce the number of welding positions for forming the individual turns upon the attachment of the first coil 41 and the second coil 42 to the core 3. As a result, the operation for attaching the first coil 41 and the second coil 42 to the core 3 can be carried out easily.

Furthermore, because the bent portions 418 in the first coil 41 and the bent portions 428 in the second coil 42 are not provided on the inner peripheral surface 303 of the core 3, it is not needed to increase the inner diameter of the core 3 for providing the bent portions 418, 428, and thereby the size of the core 3 can be reduced. As a result, the size of the inductor component 1 can be reduced.

In the first coil 41, the wire member 410 is bent by utilizing the bent portion 418 in the wire member 410 as a supporting point in such a direction that the end portion 411*e* of the first side portion 411 is brought close to the end portion 414*e* of the fourth side portion 414, thereby allowing the third side portion 413 of the wire member 410 to face the outer peripheral surface 304 of the core 3 and also allowing the fourth side portion 414 of the wire member 410 to face the second end surface 302 of the core 3. As a result, the bulging of side portions (i.e., the first side portion 411, the third side portion 413 and the fourth side portion 414) of the wire member 410 in which the bent portion 418 is not provided can be reduced. In this manner, the increase in size of the first coil 41 which can be caused by the bulging of the side portions of the wire member 410, in other words, the increase in size of the inductor component 1, can be prevented.

More specifically, when the wire member 410 is bent by utilizing the bent portion 418 as a supporting point, a part excluding the bent portion 418 in the second side portion 412 in which the bent portion 418 is provided is deformed and, as the same time, the bent portion 418 tries to get back to its original straight form. In this regard, because the bent portion 418 and the corner portions (i.e., the first to third corner portions 415 to 417) located between the adjacent side portions (i.e., the first to fourth side portions 411 to 414) are bent previously, the bent portion 418 and the corner portions (i.e., the first to third corner portions 415 to 417) undergo work hardening and therefore cannot be bent easily compared with other straight parts. Therefore, in the second side portion 412 where the bent portion 418 is provided, bending can be caused primarily in a part excluding the bent portion 418 that does not undergo the work hardening. The length of the part excluding the bent portion 418 is short. Therefore, the amount of bending deformation in the part excluding the bent portion 418 is small. As a result the bulging of the part excluding the bent portion 418 becomes small. Furthermore, this procedure is a processing for getting back (bending) the bent portion 418 into a straight shape utilizing the bent portion 418 as a supporting point, and therefore the bent portion 418 also tries to get back to its original straight shape by the action of the bending force applied in the first direction. However, the bent portion 418 cannot be deformed into an absolutely straight shape due to the work hardening.

In contrast, in a comparative example in which the straight wire material is wound around a core while bending the wire material, the wire material is bent utilizing a corner portion between adjacent side portions as a supporting point. Therefore, the corner portion cannot bent any more due to work hardening, and bending occurs in a side portion that does not undergo work hardening. As a result, bulging occurs in the side portion around the corner portion that serves as a supporting point for the bending. The length of the side portion that does not undergo the work hardening is long. Therefore, the amount of bending deformation of the part is large, and therefore the bulging in the side portion increases. As a result, the size of the first coil increases and the size of the inductor component also increases.

Similarly to the first coil 41, in the second coil 42, the wire member 420 is bent by utilizing the bent portion 428 in the wire member 420 as a supporting point in such a direction that the end portion 421*e* of the first side portion 421 is brought close to the end portion 424*e* of the fourth side portion 424, thereby allowing the third side portion 423 of the wire member 420 to face the outer peripheral surface 304 of the core 3 and also allowing the fourth side portion 424 of the wire member 420 to face the second end surface 302 of the core 3. As a result, the bulging of side portions (i.e., the first side portion 421, the third side portion 423 and the fourth side portion 424) of the wire member 420 in which the bent portion 428 is not provided can be reduced.

Second Embodiment

Figure 7A:
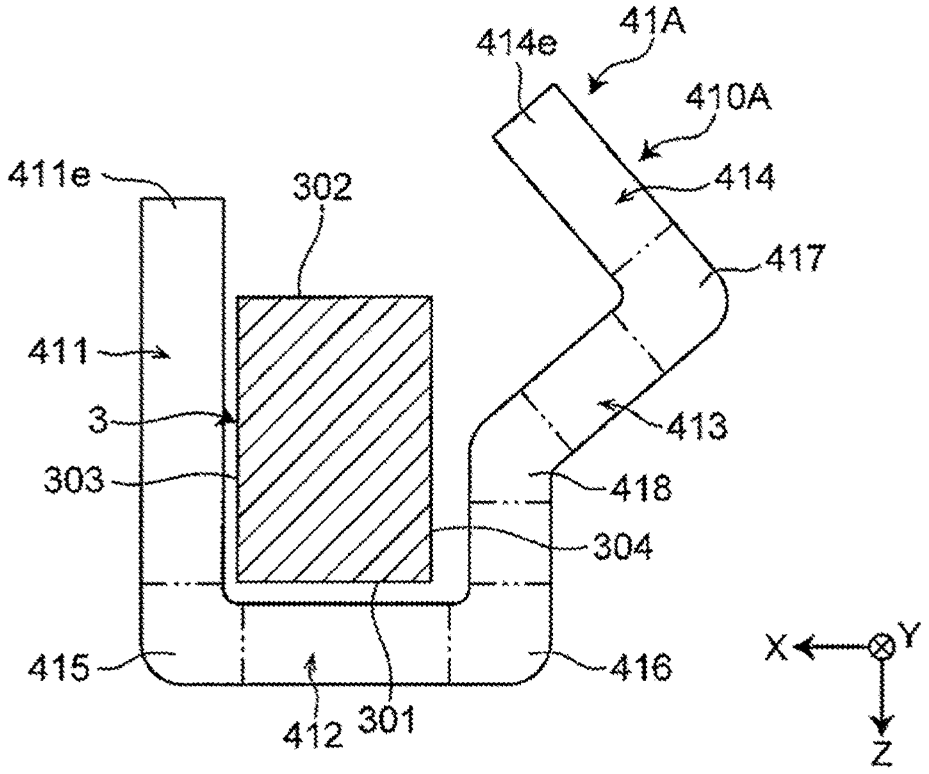
FIG. 7A is a sectional view showing a second embodiment of a wire member.

FIG. 7A is a sectional view showing a second embodiment of the wire member. The second embodiment is different from the first embodiment in the shape of the wire member. This different point in the configuration is described hereinbelow. Other points in the configuration are the same as those of the first embodiment and are indicated using the same symbols as those employed in the first embodiment, and the explanation about the same points in the configuration is omitted.

As shown in FIG. 7A, in the wire member 410A of the first coil 41A, the bent portion 418 is provided only in the third side portion 413 of the wire member 410A. The method for winding the wire member 410A around the core 3 is described as follows. The core 3 is inserted into the wire member 410A from a gap in the wire member 410A in such a manner that the first side portion 411 of the wire member 410A faces the inner peripheral surface 303 of the core 3 and the second side portion 412 of the wire member 410A faces the first end surface 301 of the core 3.

Figure 7B:
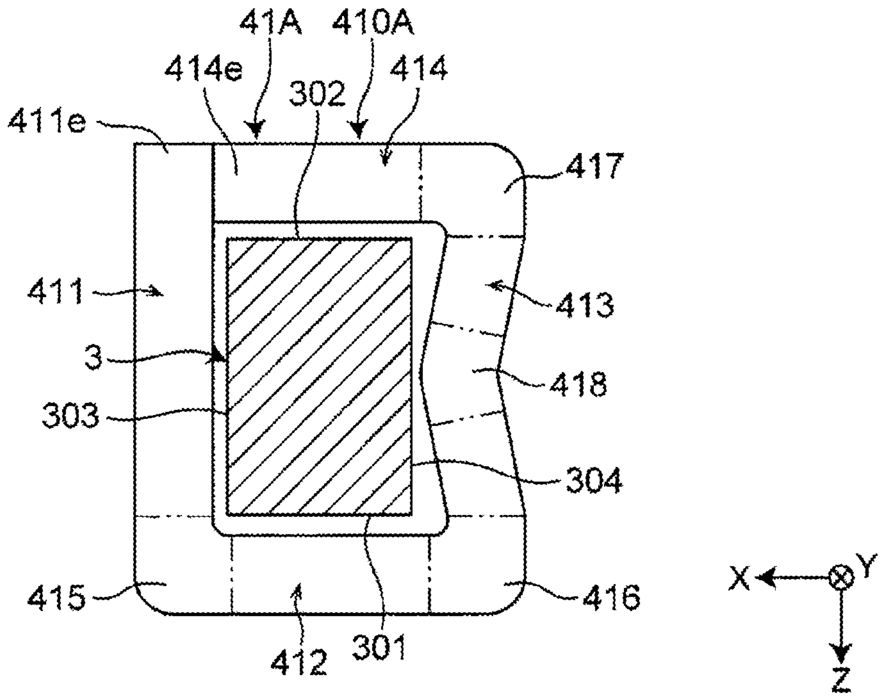
FIG. 7B is a sectional view showing a bent state of the wire member.

Subsequently, the wire member 410A is bent by utilizing the bent portion 418 in the wire member 410A as a supporting point in such a direction that the end portion 411*e* of the first side portion 411 and the end portion 414*e* of the fourth side portion 414 can be brought close to each other, thereby allowing the third side portion 413 of the wire member 410A to face the outer peripheral surface 304 of the core 3 and also allowing the fourth side portion 414 of the wire member 410A to face the second end surface 302 of the core 3 as show in FIG. 7B.

In this manner, the first coil 41A is wound around the core 3. The same procedures as for the first coil 41A are made for the second coil, and the explanation about the procedures is omitted.

According to the second embodiment, the bent portion 418 is not located in the direction of the center axis of the core 3, and therefore it becomes possible to prevent the increase in size of the core 3 in the direction of the center axis of the core 3 in the inductor component.

Third Embodiment

Figure 8A:
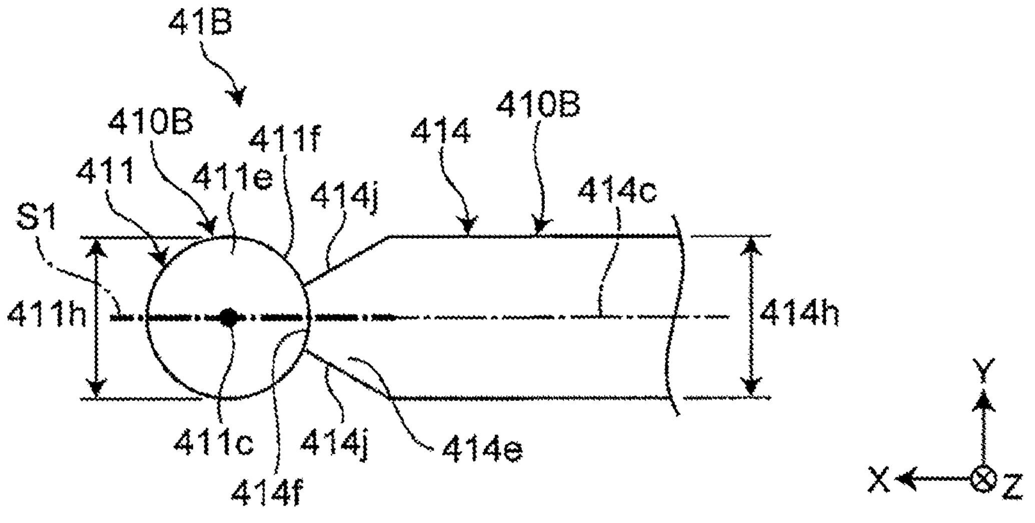
FIG. 8A is a bottom view showing a third embodiment of a wire member as observed from the Z-direction.

FIG. 8A is a bottom view showing a third embodiment of the wire member as observed from the Z-direction. The third embodiment is different from the first embodiment in the shape of the wire member. This different point in the configuration is described hereinbelow. Other points in the configuration are the same as those of the first embodiment and are indicated using the same symbols as those employed in the first embodiment, and the explanation about the same points in the configuration is omitted.

FIG. 8A shows a state where adjacent wire members 410B in the first coil 41B are assembled, rather than a state where the adjacent wire members 410B are actually welded. As shown in FIG. 8A, an end surface 414*f* of the end portion 414*e* of the fourth side portion 414 of one of the wire members 410B and a peripheral surface 411*f* of an end portion 411*e* of the first side portion 411 of the other of the wire member 410B come into contact with each other.

The end portion 411*e* of the first side portion 411 and the end portion 414*e* of the fourth side portion 414 are parts that are welded to each other. The end surface 414*f* of the end portion 414*e* of the fourth side portion 414 has a concave curved surface which is a shape that fits the peripheral surface 411*f* of the end portion 411*e* of the first side portion 411.

As observed from a direction along the center line 411*c* of the end portion 411*e* of the first side portion 411 (i.e., the Z-direction in the present embodiment), the width of the end portion 414*e* of the fourth side portion 414 is tapered toward the end surface 414*f*. More specifically, the end portion 414*e* of the fourth side portion 414 has a tapered surface 414*j* on each side in the Y-direction. The width 414*h* of a part excluding the tapered surface 414*j* in the fourth side portion 414 is the same as the width 411*h* of the end portion 411*e* of the first side portion 411. In this regard, the term “width” as herein refers to a width orthogonal to a first plane S1 which includes the center line 414*c* of the end portion 414*e* of the fourth side portion 414 and the center line 411*c* of the end portion 411*e* of the first side portion 411.

Figure 8B:
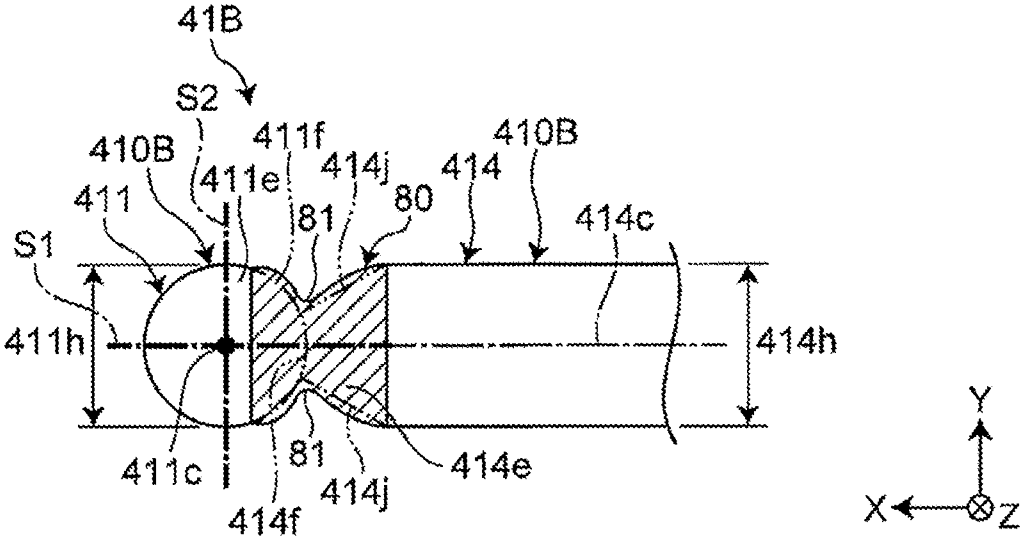
FIG. 8B is a bottom view showing a state where a first side portion of one of the wire member and a fourth side portion of the other of the wire member shown in FIG. 8A are actually welded to each other, as observed from the Z-direction.

FIG. 8B shows a state where the first side portion 411 and the fourth side portion 414 in FIG. 8A are actually welded to each other. As shown in FIG. 8B, the adjacent wire members 410B share a welded portion 80 which is formed by welding the end surface 414*f* of the end portion 414*e* of the fourth side portion 414 of one of the wire members 410B and the peripheral surface 411*f* of the end portion 411*e* of the first side portion 411 of the other of the wire member 410B to each other. The welded portion 80 is illustrated with hatching for convenience. Because the welded portion 80 is formed, it becomes possible to integrate the end surface 414*f* of the fourth side portion 414 and the peripheral surface 411*f* of the first side portion 411 together to form a whole body without forming an interface between them. Each of the end surface 414*f* and the peripheral surface 411*f* before welding is illustrated with an alternate long and two short dashes line for convenience.

The welded portion 80 has a narrowed portion 81 having a narrowed width as observed from the Z-direction. The narrowed portion 81 is provided at a position at which the end surface 414*f* of the fourth side portion 414 and the peripheral surface 411*f* of the first side portion 411 intersect each other as observed from the Z-direction. More specifically, the narrowed portion 81 is provided at the center position of the welded portion 80 as observed in the X-direction and is located at both sides of the welded portion 80 as observed in the Y-direction.

According to this configuration, because the welded portion 80 has the narrowed portion 81, it becomes possible to reduce the expansion of the welded portion 80 toward a gap between adjacent turns of the first coil 41B. As a result, the gap between the adjacent turns of the first coil 41B can be made smaller, and thereby the size of the inductor component 1 can be reduced. In particular, because the core 3 has an oval (track-like) shape, even when welded portions 80 for adjacent turns are arranged along the longer axis (Y-direction), the distance between the welded portions 80 for the adjacent turns can be secured.

The same procedures as for the first coil 41B are carried out for the second coil, and the explanation about the procedures is omitted.

The same applies to the following description.

Figure 8C:
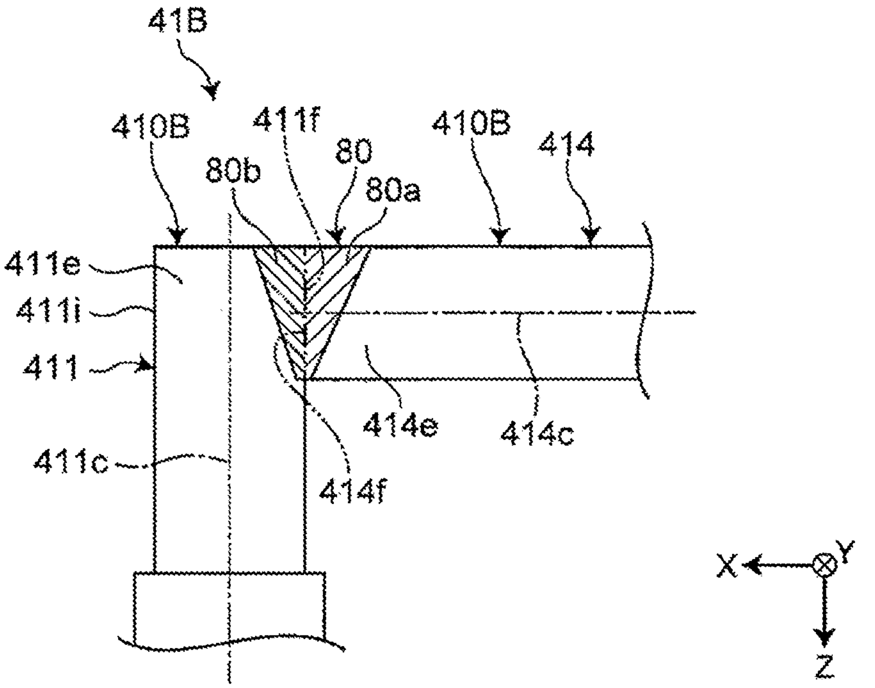
FIG. 8C is a side view of FIG. 8B as observed from the Y-direction.

FIG. 8C is a view of FIG. 8B as observed from the Y-direction. As shown in FIGS. 8B and 8C, the welded portion 80 is not provided in an outer edge 411*i* of the first side portion 411 as observed from a direction orthogonal to the first plane S1 (i.e., the Y-direction in this present embodiment).

In this regard, the outer edge 411*i* of the first side portion 411 refers to an outer edge located on the opposite side to the end portion 414*e* (inner side) of the fourth side portion 414 as observed from the Y-direction. The first side portion 411 has a columnar shape. Therefore, the outer edge 411*i* of the first side portion 411 corresponds to a line. In the case where the first side portion 411 has a prismatic shape, the outer edge 411*i* of the first side portion 411 corresponds to a plane.

According to this configuration, because the welded portion 80 is not provided in the outer edge 411*i* of the first side portion 411, the welded portion 80 can reduce the surface tension generated toward the outer edge 411*i* of the first side portion 411, and therefore does not have a spherical shape that covers the outer edge 411*i*. Therefore, the size of the welded portion 80 can be reduced, and thereby the gap between adjacent turns of the first coil 41B can be made smaller. As a result, the size of the inductor component 1 can be reduced. Furthermore, it also becomes possible to reduce the expansion of the welded portion 80 toward further outside than the outer edge 411*i* of the first side portion 411, resulting in the reduction of the outer shape of the first coil 41B.

The welded portion 80 is provided further inside than a second plane S2 which includes the center line 411*c* of the end portion 411*e* of the first side portion 411 and is orthogonal to the first plane S1 as observed from the Z-direction. In this regard, the wording "the further inner side than the second plane S2" refers to a side closer to the end portion 414*e* of the fourth side portion 414 than the second plane S2 as observed from the Z-direction. According to this configuration, because the welded portion 80 is provided on an inner side than the second plane S2, the size of the welded portion 80 can be made further smaller, and therefore the gap between adjacent turns of the first coil 41B can be made further smaller. As a result, the size of the inductor component 1 can be reduced.

As shown in FIG. 8C, the welded portion 80 is formed in a triangular shape as observed from the Y-direction. The term "triangular shape" as used herein includes an absolutely triangular shape as well as a substantially triangular shape having a curved angle or side. More specifically, one side of the triangular shape is located in the backward direction of the Z-direction and a corner of the triangular shape is located in the forward direction of the Z-direction as observed from the Y-direction. It is preferred that the welded portion 80 has a conical shape. According to this configuration, because the welded portion 80 is formed in a triangular shape, the welded portion 80 cannot have a spherical shape and the size of the welded portion 80 can be made further smaller. As a result, the gap between adjacent turns of the first coil 41B can be made further smaller, and thereby the size of the inductor component 1 can be reduced.

The area of the welded portion 80 in the end portion 414*e* of the fourth side portion 414 (wherein the area is also referred to as a "first area 80*a*", hereinafter) is larger than the area of the welded portion 80 in the end portion 411*e* of the first side portion 411 (wherein the area is also referred to as a "second area 80*b*", hereinafter) as observed from the Y-direction. The boundary between the first area 80*a* and the second area 80*b* is the boundary between the end surface 414*f* and the peripheral surface 411*f* before welding, each of which is illustrated with an alternate long and two short dashes line. According to this configuration, because the first area 80*a* is larger than the second area 80*b*, the amount of the welded portion 80 provided in the end portion 411*e* of the first side portion 411 can be reduced. Therefore, the formation of the welded portion 80 on the side of the outer edge 411*i* of the first side portion 411 can be reduced. As a result, the size of the welded portion 80 can be made further smaller, and therefore the gap between adjacent turns of the first coil 41B can be made further smaller, whereby the size of the inductor component 1 can be reduced.

The welded portion 80 is provided over the whole area of the periphery of the end portion 414*e* of the fourth side portion 414. Therefore, the end portion 414*e* of the fourth side portion 414 and the end portion 411*e* of the first side portion 411 can be connected to each other strongly.

The present disclosure is not limited to the above-described embodiments, and can be modified without departing from the spirit and scope of the present disclosure. For example, the characteristic features of the first to third embodiments may be combined in various ways.

In the first to third embodiments, the bent portion is provided in the second or third side portion. However, the bent portion may be provided in both of the second and third side portions. The bent portion is provided at the center of the side portion. However, the bent portion may be provided on a corner portion side rather than the center of the side portion. Alternatively, it is possible to intentionally form a part that does not undergo work hardening by shifting the position of the bent portion toward the corner portion direction. In this case, by utilizing the part that is not work-hardened, the wire member can be bent in such a direction that end portions of adjacent wire members can come in contact with each other.

In the first embodiment, adjacent wire members are fixed to each other by the bonding member. However, the adjacent wire members may not be fixed to each other by the bonding member.

In the third embodiment, the welded portion is provided on a further inner side than the second plane as observed from the Z-direction. However, the welded portion may be provided on a further outer side than the second plane as observed from the Z-direction.

In the third embodiment, the welded portion has a narrowed portion having a narrowed width as observed in the Z-direction. However, the welded portion may not have the narrowed portion.

What is claimed is:

1. An inductor component comprising:

a ring-shaped core; and a coil which is wound around the core and comprises a plurality of wire members each constituting a single turn, each of the wire members including a first side portion which faces an inner peripheral surface of the core, a second side portion which faces a first end surface of the core that is one end surface of the core in a direction of a center axis of the core, a third side portion which faces an outer peripheral surface of the core, and a fourth side portion which faces a second end surface of the core that is the other end surface of the core in the direction of the center axis of the core, wherein the at least one of the second side portion and the third side portion has a bent portion that is bent so as to protrude toward the core side, and in two adjacent wire members in the plurality of wire members, an end portion of the fourth side portion of one of the wire members is connected to an end portion of the first side portion of the other of the wire members, such that the plurality of wire members are wound spirally around the core.

2. The inductor component according to claim 1, wherein the bent portion is provided only in the second side portion of the wire members.

3. The inductor component according to claim 2, wherein a height of the core in a direction of the center axis of the core is larger than a thickness of the core in a direction of a diameter of the core.

4. The inductor component according to claim 1, wherein the bent portion is provided only in the third side portion of the wire members.

5. The inductor component according to claim 1, wherein each of a first corner portion between the first side portion and the second side portion, a second corner portion between the second side portion and the third side portion, and a third corner portion between the third side portion and the fourth side portion has a substantially right angle, and a shape of a cross section of the core which is orthogonal to a direction of the extension of the core is quadrilateral.

6. The inductor component according to claim 1, wherein the adjacent wire members are fixed to each other by a bonding member.

7. The inductor component according to claim 6, wherein in the adjacent wire members, the bonding member fixes the first side portion of one of the wire members to the first side portion of the other of the wire members, and each of the first side portion of the one of the wire members and the first side portion of the other of the wire members does not have the bent portion.

8. The inductor component according to claim 1, wherein the adjacent wire members share a welded portion at which an end surface of the end portion of the fourth side portion of the one of the wire members and a peripheral surface of the end portion of the first side portion of the other of the wire member are welded to each other, and the welded portion has a narrowed portion having a narrow width when viewed from a direction along a center line of the end portion of the first side portion of the other of the wire member.

9. The inductor component according to claim 2, wherein each of a first corner portion between the first side portion and the second side portion, a second corner portion between the second side portion and the third side portion, and a third corner portion between the third side portion and the fourth side portion has a substantially right angle, and a shape of a cross section of the core which is orthogonal to a direction of the extension of the core is quadrilateral.

10. The inductor component according to claim 3, wherein each of a first corner portion between the first side portion and the second side portion, a second corner portion between the second side portion and the third side portion, and a third corner portion between the third side portion and the fourth side portion has a substantially right angle, and a shape of a cross section of the core which is orthogonal to a direction of the extension of the core is quadrilateral.

11. The inductor component according to claim 4, wherein each of a first corner portion between the first side portion and the second side portion, a second corner portion between the second side portion and the third side portion, and a third corner portion between the third side portion and the fourth side portion has a substantially right angle, and a shape of a cross section of the core which is orthogonal to a direction of the extension of the core is quadrilateral.

12. The inductor component according to claim 2, wherein the adjacent wire members are fixed to each other by a bonding member.

13. The inductor component according to claim 3, wherein the adjacent wire members are fixed to each other by a bonding member.

14. The inductor component according to claim 4, wherein the adjacent wire members are fixed to each other by a bonding member.

15. The inductor component according to claim 5, wherein the adjacent wire members are fixed to each other by a bonding member.

16. The inductor component according to claim 2, wherein the adjacent wire members share a welded portion at which an end surface of the end portion of the fourth side portion of the one of the wire members and a peripheral surface of the end portion of the first side portion of the other of the wire member are welded to each other, and the welded portion has a narrowed portion having a narrow width when viewed from a direction along a center line of the end portion of the first side portion of the other of the wire member.

17. The inductor component according to claim 3, wherein the adjacent wire members share a welded portion at which an end surface of the end portion of the fourth side portion of the one of the wire members and a peripheral surface of the end portion of the first side portion of the other of the wire member are welded to each other, and the welded portion has a narrowed portion having a narrow width when viewed from a direction along a center line of the end portion of the first side portion of the other of the wire member.

18. The inductor component according to claim 4, wherein the adjacent wire members share a welded portion at which an end surface of the end portion of the fourth side portion of the one of the wire members and a peripheral surface of the end portion of the first side portion of the other of the wire member are welded to each other, and the welded portion has a narrowed portion having a narrow width when viewed from a direction along a center line of the end portion of the first side portion of the other of the wire member.

19. The inductor component according to claim 1, wherein the bent portion is between ends of the second side portion or between ends of the third side portion.

* * * * *